United States Patent [19]
Vincent

[11] Patent Number: 5,207,921
[45] Date of Patent: May 4, 1993

[54] INDUSTRIAL WASTE WATER RECLAMATION PROCESS

[76] Inventor: John D. Vincent, 531 SW. 63 Ter., Margate, Fla. 33068

[21] Appl. No.: 865,825

[22] Filed: Apr. 1, 1992

Related U.S. Application Data

[63] Continuation of Ser. No. 580,148, Sep. 10, 1990, abandoned.

[51] Int. Cl.$^5$ .............................................. C02F 1/24
[52] U.S. Cl. .................................... 210/704; 210/708; 210/709; 210/743; 210/745; 210/748; 210/776; 210/804
[58] Field of Search ............... 210/703, 704, 745, 721, 210/743, 748, 776, 709, 804, 708, 201, 202, 205, 259, 295, 519

[56] References Cited

U.S. PATENT DOCUMENTS

| | | | |
|---|---|---|---|
| 2,883,059 | 4/1959 | Puddington et al. | 210/519 |
| 3,353,676 | 11/1967 | Hirsch | 210/519 |
| 3,393,149 | 7/1968 | Conley et al. | 210/202 |
| 3,966,603 | 6/1976 | Grant | 210/745 |
| 4,179,616 | 12/1979 | Coviello et al. | 210/748 |
| 4,193,869 | 3/1980 | Brucker et al. | 210/705 |
| 4,207,185 | 6/1980 | Hinds | 210/703 |
| 4,731,176 | 3/1988 | Macdonald | 209/166 |
| 4,738,783 | 4/1988 | Sugihara et al. | 210/705 |
| 4,790,943 | 12/1988 | Dunn et al. | 210/705 |
| 4,855,065 | 8/1989 | Keeter et al. | 210/776 |
| 4,933,087 | 7/1990 | Markham et al. | 210/631 |

FOREIGN PATENT DOCUMENTS 1493619 7/1987 U.S.S.R. .............................. 210/703

*Primary Examiner*—Peter Hruskoci
*Attorney, Agent, or Firm*—Malin, Haley, DiMaggio & Crosby

[57] ABSTRACT

A process and system for continuously recovering industrial waste water characterized as divergent hydrolipophilic waste streams for industrial reuses to enhance water conservation and to reduce environmental pollution is disclosed. The process and system are especially suited for reclaiming animal and food processing discharge water having blood, fat, oil and grease contaminants in the water, for industrial reuse in evaporative condensers, hydraulic system cooling and equipment, non-food contact vehicles and plant or factory area wash-downs. The process can operate continuously for supplying water for such industrial uses, but also includes an automatic shut down if the incoming influent to be treated is too turbid. The process includes chemical pH adjustment, separation of fat, oil and grease (FOG) from the influent and particulate removal in polishing filters. Sensors are used to monitor the pH and component internal water pressures throughout. An air sparging coil and three individual tanks separate the FOG and water in three stages. The polishing filters then remove particulates (including the heme molecules). Finally, the processed water is treated with ultraviolet disinfection to kill microfloura and microfauna bacteria. The water is then ready for industrial reuse in evaporative condensers (cooling towers) water cooled hydraulic systems, vacuum pump systems, wash down of docks, recovery areas or vehicles and outdoor reuse.

3 Claims, 2 Drawing Sheets

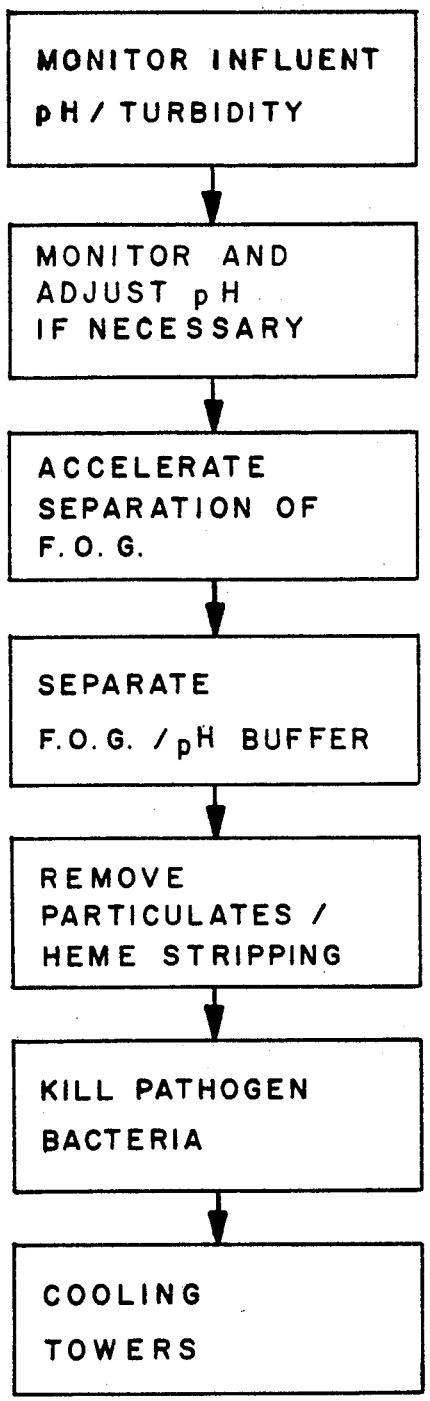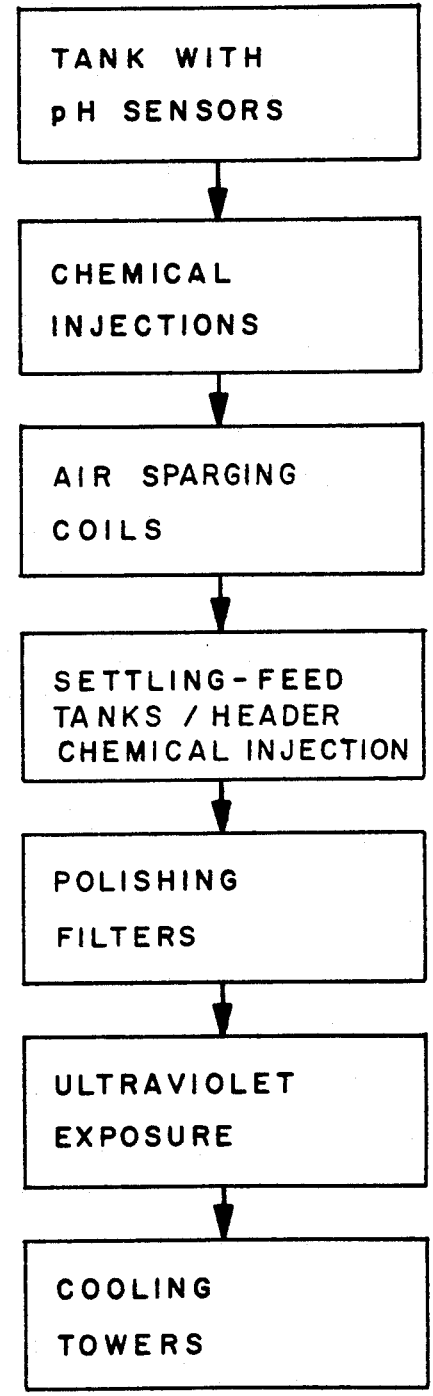

INDUSTRIAL WASTE WATER RECLAMATION PROCESS

This application is a continuation of application Ser. No. 07/580,148, filed Sep. 10, 1990 now abandoned.

BACKGROUND OF THE INVENTION

1. Field of the Invention

This invention relates generally to a process and system for treating industrial waste water so that the water may be reclaimed for other industrial uses, and specifically to a waste water treatment process and system that reclaims industrial waste water having hydro-lipophilic contaminants resulting from animal and food processing for industrial reuse as a coolant in evaporative condensers and/or equipment with non-food contact, thus conserving fresh water and reducing industrial pollution.

2. Description of the Prior Art

Fresh water is one of the most important of all natural resources. The use of fresh water for growing populations, personal consumption and in industrial processes has created a tremendous demand on fresh water availability. Although nature recycles fresh water through natural processes, many industrial countries in populous areas are finding that human and industrial consumption is exceeding and depleting the amount of fresh water available. Ironically, the large usage of fresh water especially in industrial processes, provide a large volume of industrial waste which itself can contribute to contamination of existing fresh water supplies. Many local governments in the U.S. attack the problem by charging user fees or in effect taxes based on the amount of waste discharged in addition to charging for the fresh water supply. Such user fees increase the cost of doing business and ultimately the cost of goods to the consumer.

There exists a need to use fresh water more efficiently and to reduce environmental pollution particularly in the food processing industry. Animal and food processing industries consume large amounts of fresh water both for the specific food processing and for auxiliary equipment such as refrigeration units, in non-food contact process equipment and the like. To date, the contaminated water discharged from food processing has resulted in increasing environmental pollution.

The purpose of the present invention is to provide a water reclamation process and system that allows for reuse of industrially contaminated water that has been discharged as waste in a typical industrial process that results in contaminating water with fat, oil, grease and blood, such as in the poultry industry. Typically because of the contaminants, the discharge waste is not suitable for industrial reuse.

With use of the present invention, a large volume of waste water which would otherwise be adding pollution to the environment, can be reclaimed and reused collaterally in other auxiliary industrial machinery. Therefore fresh water is saved and environmental pollution is reduced simultaneously.

U.S. Pat. No. 4,933,087 is directed to the purification of waste waters from food processing plants which utilize polysaccharides for coagulation of fats and proteins in the waste water.

U.S. Pat. No. 4,855,065 issued to Keeter shows a waste water contaminant removal process that incorporates a hydrocylone and constrictive collection passageways for the clarification of waste water streams from meat packing, rendering, poultry processing plants and the like.

None of the references provide for reclamation of water for industrial reuse as in the process shown by the present invention.

SUMMARY OF THE INVENTION

A continuous process and system is disclosed for removing hydrolipophilic contaminants, blood and other particulates from animal and food processing waste water to reclaim the water for reuse for other industrial purposes. Broadly, the process comprises the steps of monitoring influent turbidity, monitoring and adjusting (if necessary) the pH of the influent, separating fats, oils and grease from the influent, removing FOG and blood particulates and killing microfloura and microfauna bacteria. The reclaimed water is then reusable for industrial equipment such as evaporative condensers, water cooled hydraulic systems, rotary screens, vacuum pump systems, the wash-downs of docks or other industrial plant areas, vehicle washdown and other outdoor water uses.

An important aspect of the invention is that the influent may be received from divergent sources which contain hydrolipophilic contaminants and blood. These types of fat, oil and grease contaminants result from animal and food processing in general, and in one specific use described herein would result from poultry processing typically from a chiller and/or a Dissolved Air Floatation (DAF) both of which discharges can be received by the system for reclamation.

Initially the influent is collected in a tank. The turbidity of the influent is monitored to protect the overall system from overload. The pH is monitored and adjusted to aid in the separation of the emulsified FOG contaminants prior to entering the first settling tank.

After the pH has been adjusted (if necessary,) to the desired value for separation, the process of separating FOG is accelerated by the use of air sparging coils located between the collection tank and the first settling tank therefore providing more surface area for the separation of the water and the emulsified FOG. After the air sparging coils, the influent is directed into the first settling tank through a conduit which includes a slotted header or distributor which aids in reducing turbulence which might otherwise result.

The influent is continuously transferred into a second settling tank which includes a skimming pump(s) and/or skimming system and outlet conduit for removing the separated FOG from the second settling tank.

Further separation is accomplished in a third distribution tank in which the effluent from the second settling tank is transferred on a continuous basis. The output of the distribution tank is then pumped to a plurality of polishing filters which remove particulates from the effluent. The water is then fed through ultraviolet disinfection for eradication of bacteria and/or microscopic life forms.

After the treatment with ultraviolet disinfection, the reclaimed water is ready for reuse in other industrial applications which would compliment for example, the poultry processing industry. In one example, the recycled water could be used in an evaporative condenser which itself consumes thousands of gallons of water per day for each one thousand tons of refrigeration. Using this example it can be seen that the amount of fresh water consumed for poultry processing and concomitantly the amount of industrial waste are significantly reduced. Other industrial reuses of the recycled water greatly saves on the demand for fresh water in the original process.

The system and process is operated on a continuous basis by maintaining a continuous flow through the air sparging coils, the settling tanks, the distribution tank, polishing filters and the ultraviolet disinfection treatment, while constantly monitoring the influent turbidity and pH.

The system includes influent diverting valves that are connected to the influent monitoring sensors such that if the turbidity of the influent is too great for the system to handle, influent is diverted back to its source or otherwise discharged, thereby alleviating the potential overload of system design.

As described above, after separation of all of the oils, fats and greases from the water, the influent is directed to a dual media polishing filtration system wherein particulates and suspended solids down to the 14–15 micron size are removed.

The system also includes automatic sensing devices that de-energize all active components and energize automatic control valves to divert influent if the filtering units experience internal pressures greater than preset levels.

The system is designed to reclaim and reuse industrial waste water typically containing FOG contaminants specifically to reduce the consumption of fresh water being used by the overall processing plant and to remove the contaminants inexpensively. The recycled water can also be reused in various other phases of the overall industrial operation reducing the amount by total volume of waste from the poultry processing industry thereby reducing deleterious environmental impact.

The specific system employed can be cost effectively constructed and does not consume a large amount of industrial space. In a typical configuration as used for reclaiming effluent from a poultry processing plant, the system may reclaim water discharged from the chiller and/or the D.A.F. commonly used in poultry processing. This influent typically contains fats, oils and grease and heme (blood) particulates resulting from the poultry carcass.

It is an object of this invention to reduce the consumption of fresh water used in animal and food processing plants by inexpensively removing fat, oil, grease and hemme contaminants to enable the reclaimed water to be reused for other industrial applications reducing the amount of fresh water consumed in the overall process.

It is another object of this invention to provide a reclamation process and system for use in poultry or other animal and food processing industries to reduce the amount of fresh water required for the overall poultry processing and reduce the volume of waste discharge into the environment by utilizing large amounts of the initial poultry waste water in other industrial applications.

It is yet another object of this invention to provide a water reclamation processing system for recycling industrial waste water in a continuous process to reduce the amount of fresh water consumed and reduce the volume of waste water being discharged in the environment from a poultry or other food processing plant.

Yet another object of this invention is to provide a totally automated continuous processing system for reclaiming industrial waste water containing FOG contaminants so that the waste water may be reclaimed for other industrial uses.

In accordance with these and other objects which will be apparent hereinafter, the instant invention will now be described with particular reference to the accompanying drawings.

BRIEF DESCRIPTION OF THE DRAWINGS

FIG. 3 shows a flow chart of the process utilized in the present invention.

FIG. 4 shows a flow chart used in conjunction with FIG. 3 and establishes the components of the system utilized in the process described in FIG. 3.

PREFERRED EMBODIMENT OF THE INVENTION

Figure 1:
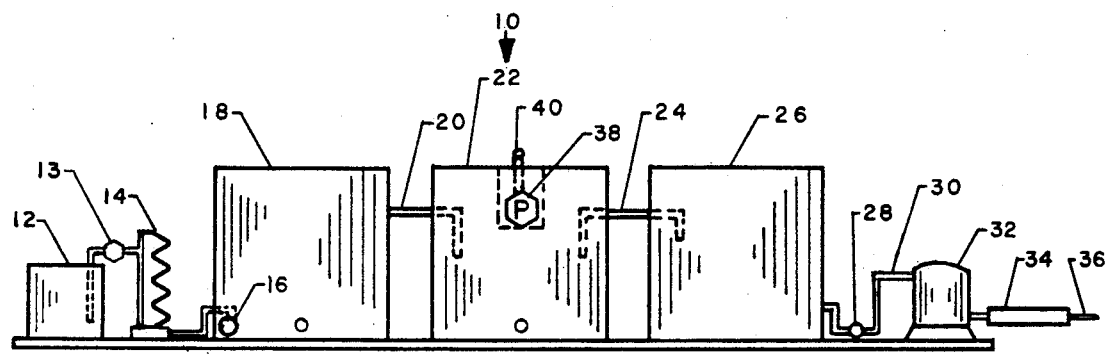
FIG. 1 shows a side elevational view of a system utilized in the present invention.

Referring now to FIG. 1, the present invention is shown generally at 10 comprised of several different components utilized to accomplish the overall process in a force feed, influent in, polished water out system.

The discharged waste or influent which could be the discharge from a chiller used in the poultry industry, is transported by an inlet conduit into a storage reservoir 12, which is essentially an open circular tank.

Prior to the reservoir tank 12, the influent is monitored for turbidity. In the tank 12, the pH is monitored and a pH adjustment is made if necessary in order to put the pH at a level to most aid in separating fats, oils and greases from the water. If necessary, chemicals are added in the reservoir tank to achieve the desired pH.

An outlet pipe from within the reservoir 12 leads to a pump 13 and then to air sparging coils 14 where air from an air compressor (not shown) under pressure is injected into the stream of influent being pumped from the storage reservoir 12 into a first settling tank 18. A fluid distribution header 16 (essentially an elongated closed end pipe with peripheral outlet slots) reduces the turbulence of the influent flow as it is discharged into the circular first settling tank 18. The air sparging coils 14 act to accelerate the separation process of the fats, oils and greases that are in the water.

The separation process of FOG and water continues in settling tank 18. Influent is continuously transferred through conduit 20 into a second cylindrical, open separation tank 22. Second separation or settling tank 22 contains a skimming pump(s) and/or skimming system 38 near its top and a skimming discharge or outlet conduit 40 which continuously discharges the separated fats, oils and greases residing at the top of the tank 22, thus separating the FOG from water 22. Another outlet conduit 24 from the separation tank 22 with an inlet opening disposed near the bottom of tank 22, far removed from the FOG layer floating on the top of the liquid continuously transfers the water to the distribution tank 26 which continues the separation process. Distribution tank 26 has an outlet conduit 30 connected to a pump 28 which pumps the water from distribution tank 26 into a series of polishing filters 32 to remove particulates including hemme particles. The water at this point, after passing through the polishing filters, proceeds through an outlet conduit 36 housing an ultraviolet disinfection device 34 which kills any bacteria residing in the water. Once discharged from the ultraviolet disinfection device, the recycled water is ready for reuse in other industrial applications such as a coolant for evaporative condensers used in an refrigeration system, or one pass industrial equipment or for cleaning and washing down non-food contact areas.

Included in the conduit leading to the initial storage reservoir is a sensor for monitoring turbidity which can send signals to a diverter valve at the inlet conduit of the system to automatically divert inlet influent back to its original source if necessary causing the inlet pump (and the entire system) to shut down so that the system is not over-taxed. Likewise, pressure sensors are used in predetermined strategic locations so that if the influent pressure becomes too great in any part of the system such as the polishing filters, the entire system can be shut down automatically.

Figure 2:
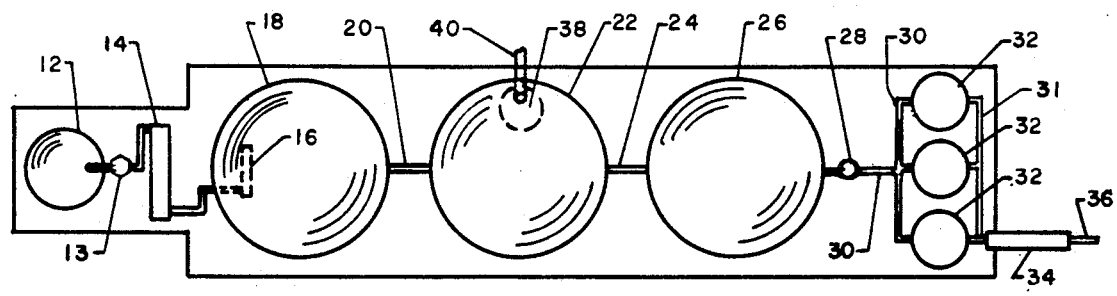
FIG. 2 shows a top plan view of the system described in FIG. 1.

FIG. 2 shows a top view of the system described in FIG. 1 including the reservoir 12, pump 13, the first and second settling tanks 18 and 22 and the distribution tank 26. Also shown is the skimming pump 38 and the skimming pump discharge outlet conduit 40 through which the fats, oils and greases are removed from the second settling or separation tank.

FIGS. 3 and 4 show a side-by-side comparison of the steps of the process utilized in the invention in FIG. 3 and the invention components in FIG. 4 which accomplish the corresponding steps in the process.

The process and system in accordance with the invention by providing for monitoring the influent and adjustment of the pH is capable of receiving influent from a number of divergent sources simultaneously which can be especially useful in poultry or other animal processing. The system is not so specialized in construction that it could not handle diverse waste products allowing for much greater operational flexibility and water reclamation in an entire food or other processing plants producing high levels of FOG and related contaminants.

The particular benefit in utilizing the present invention is that reclaimed water, once processed, has a multitude of industrial uses, conserving fresh water, such as in evaporative condensers, as a coolant for industrial equipment or wash down of non-food contact industrial plant areas, washing vehicles and other outdoor uses. In the case of the evaporative condensers and plant wash down much of the working water is evaporated or redirected reducing the total environmental waste discharges of the plant significantly. Thus the system creates a synergistic effect for reducing the amount of fresh water required overall to operate the plant while at the same time greatly reducing the volume of environmental industrial waste being discharged from the plant.

The instant invention has been shown and described herein in what it is considered to be the most practical and preferred embodiment. It is recognized, however, that departures may be made therefrom within the scope of the invention and that obvious modifications will occur to a person skilled in the art.

What I claim is:

1. An improved water reclamation process for removing emulsified fats, oils, and greases, and particulates from an animal or food processing waste stream to produce water suitable for reuse in non-food processing industrial applications, consisting of the steps of:
   providing a storage reservoir having an inlet and an outlet;
   directing said animal or food processing, waste stream to the inlet of said storage reservoir;
   continuously monitoring the inlet of said storage reservoir for pH and turbidity of said waste stream, and continuously adjusting the pH when necessary to a desired value to aid in separation of said emulsified fats, oils, and greases from said waste stream;
   diverting the inlet waste stream away from said inlet of said storage reservoir if the turbidity exceeds a predetermined value;
   providing a first settling tank having a bottom mounted inlet and a centrally located outlet coupled in a series arrangement with said reservoir outlet;
   transferring the waste stream from said storage reservoir to an air sparging coil for injecting air into said waste stream to accelerate the separation of said emulsified fats, oils, and greases from said waste stream; discharging said waste stream into a first settling tank through a distribution header located in the lower portion of said first settling tank for reducing turbulence;
   providing a second settling tank having a centrally mounted inlet and a centrally located outlet;
   transferring the waste stream from said first settling tank to said second settling tank for separating said emulsified fats, oils, and greases, and particulates from said waste stream;
   skimming the separated fats, oils, and greases, and particulates from the waste stream in the second settling tank;
   providing a distribution tank having a centrally mounted inlet and a bottom located outlet;
   transferring the waste stream from said second settling tank through said centrally located outlet to said distribution tank;
   providing a plurality of pressurized polishing filters for removing particulates from the waste stream remaining after skimming;
   transferring the waste stream from said distribution tank to said polishing filters by means of a pump;
   providing ultraviolet exposure for killing bacteria in the waste stream; and
   directing the waste stream from the outlet of said third settling tank, through said polishing filters and said ultraviolet exposure to produce a treated waste stream suitable for use or storage in non-food processing industrial purposes.

2. The process according to claim 1, wherein said header consists of an elongated closed end pipe having peripheral slots.

3. An improved process as described in claim 1, wherein said air is injected with an air compressor in combination with said air sparging coil.

* * * * *